(12) United States Patent
Yamamoto

(10) Patent No.: US 7,804,638 B2
(45) Date of Patent: Sep. 28, 2010

(54) ELECTROPHORETIC DISPLAY SHEET, ELECTROPHORETIC DISPLAY, METHOD FOR PRODUCING ELECTROPHORETIC DISPLAY, AND ELECTRONIC APPARATUS

(75) Inventor: Hitoshi Yamamoto, Chino (JP)

(73) Assignee: Seiko Epson Corporation, Tokyo (JP)

( * ) Notice: Subject to any disclaimer, the term of this patent is extended or adjusted under 35 U.S.C. 154(b) by 169 days.

(21) Appl. No.: 12/034,333

(22) Filed: Feb. 20, 2008

(65) Prior Publication Data

US 2008/0204855 A1 Aug. 28, 2008

(30) Foreign Application Priority Data

Feb. 23, 2007 (JP) .............. 2007-044685

(51) Int. Cl.
*G02B 26/00* (2006.01)

(52) U.S. Cl. ..................................... 359/296

(58) Field of Classification Search ................ 359/296; 345/107, 105; 204/450, 600; 430/32, 34, 430/38
See application file for complete search history.

(56) References Cited

U.S. PATENT DOCUMENTS

| | | | |
|---|---|---|---|
| 7,012,735 B2 * | 3/2006 | Honeyman et al. | 359/296 |
| 7,151,603 B2 * | 12/2006 | Kellie | 356/342 |
| 7,352,502 B2 * | 4/2008 | Miyazaki et al. | 359/296 |
| 7,436,577 B2 * | 10/2008 | Moriyama et al. | 359/296 |

FOREIGN PATENT DOCUMENTS

| | | |
|---|---|---|
| JP | A 2002-202534 | 7/2002 |
| JP | 2003-287776 A | 10/2003 |
| JP | 2004-053679 A | 2/2004 |
| JP | 2005-134846 A | 5/2005 |
| JP | 2005-309079 A | 11/2005 |
| JP | 2006-133561 A | 5/2006 |
| JP | 2006-235137 A | 9/2006 |

\* cited by examiner

*Primary Examiner*—Scott J Sugarman
*Assistant Examiner*—Tuyen Q Tra
(74) *Attorney, Agent, or Firm*—Oliff & Berridge, PLC

(57) ABSTRACT

An electrophoretic display sheet includes: a substrate; at least one kind of electrophoretic particles; an electrophoretic dispersion liquid containing the at least one kind of electrophoretic particles; a microcapsule having a shell for enclosing the electrophoretic dispersion liquid therein; a microcapsule-containing layer provided on a surface side of the substrate to contain the microcapsule; and a binder having a function of retaining the microcapsule and having viscosity under room temperature, the microcapsule-containing layer including the microcapsule and the binder; and the electrophoretic particles being contained in the electrophoretic dispersion liquid in a ratio of 30% to 60% wt. with respect to a weight of the electrophoretic dispersion liquid.

22 Claims, 6 Drawing Sheets

ELECTROPHORETIC DISPLAY SHEET, ELECTROPHORETIC DISPLAY, METHOD FOR PRODUCING ELECTROPHORETIC DISPLAY, AND ELECTRONIC APPARATUS

This application claims priority from Japanese Patent Application No. 2007-044685 filed in the Japanese Patent Office on Feb. 23, 2007, the entire disclosure of which is hereby incorporated by reference in its entirety.

BACKGROUND

1. Technical Field

The present invention relates to an electrophoretic display sheet, an electrophoretic display, a method for producing an electrophoretic display, and an electronic apparatus.

2. Related Art

It is generally known that when an electric field is applied to a dispersion system prepared by dispersing particles in a liquid, the particles are moved (migrated) in the liquid by the Coulomb force. The phenomenon is called electrophoresis. Recently, as a new type of display, electrophoretic displays have been put in the spotlight, where the electrophoretic phenomenon is taken advantage of to have intended information (images) on a display screen.

The electrophoretic display retains its display memory performance with a wide viewing angle even when an applied voltage is switched off, as well as an additional feature of the display enables high-contrast image display to be achieved at low power consumption.

The electrophoretic display, which is a non-light emitting device, is also characterized by being easy on the eyes, as compared with a light emitting display device such as a cathode ray tube (CRT).

Among the electrophoretic displays as above, there is a known type of display with a plurality of microcapsules. In the display, between a pair of substrates with electrodes thereon, there are provided the microcapsules each enclosing electrophoretic particles and a liquid phase dispersion medium, along with a binder for fixing the substrates to the microcapsules.

In order to produce such an electrophoretic display, JP-A-2002-202534 discloses an example method. In the method, on one of a pair of substrates is supplied a microcapsule dispersion liquid that contains a plurality of microcapsules, a binder, and a dispersion medium. Next, the dispersion medium is removed to locate the microcapsules, and then the other substrate is bonded to the substrate.

In the above patent, an emulsion adhesive is used as the binder. However, the adhesive hardens under room temperature. Thus, once the microcapsules are placed on one of the substrates, it is hard for the microcapsules to be relocated. Consequently, in the electrophoretic display produced, there exist a region with the microcapsules overlapping each other and a region without any of the microcapsules located, thereby causing display unevenness in the display.

SUMMARY

An advantage of the present invention is to provide an electrophoretic display sheet that enables construction of an electrophoretic display excellent in display performance and production yield, a highly reliable electrophoretic display, an easy and reliable method for producing the electrophoretic display, and a highly reliable electronic apparatus.

The above advantages can be obtained through aspects of the invention described below.

An electrophoretic display sheet according to a first aspect of the invention includes a substrate; at least one kind of electrophoretic particles; an electrophoretic dispersion liquid containing the at least one kind of electrophoretic particles; a plurality of microcapsules having a shell for enclosing the electrophoretic dispersion liquid therein; a microcapsule-containing layer provided on a surface side of the substrate to contain the plurality of microcapsules; and a binder having a function of retaining the microcapsule and having viscosity under room temperature, the microcapsule-containing layer including the plurality of microcapsules and the binder; and the electrophoretic particles being contained in the electrophoretic dispersion liquid in a ratio of 30% to 60% by weight (wt.) with respect to a weight of the electrophoretic dispersion liquid.

In this manner, the microcapsules are aligned with a good size precision, so that display unevenness can be prevented.

In addition, due to the appropriate ratio of the electrophoretic particles contained in the electrophoretic dispersion liquid, a good display performance can be maintained, as well as a migration velocity of the electrophoretic particles can be increased.

In the electrophoretic display sheet of the first aspect, the "room temperature" means, for example, a temperature for using the display sheet. Typical temperatures for the use of the sheet range from 15 to 30° C., and a preferable temperature is 25° C. or close thereto.

An electrophoretic display sheet according to a second aspect of the invention includes a substrate; at least one kind of electrophoretic particles; an electrophoretic dispersion liquid containing the at least one kind of electrophoretic particles; a plurality of microcapsules having a shell for enclosing the electrophoretic dispersion liquid therein; a microcapsule-containing layer provided on a surface side of the substrate to contain the plurality of microcapsules; and a binder having a function of retaining the plurality of microcapsules and having viscosity under room temperature, the microcapsule-containing layer including the plurality of microcapsules and the binder; the binder having a 180° peel adhesion strength (in accordance with JIS-K-6854) ranging from 5N/25 mm to 150N/25 mm; and the electrophoretic particles being contained in the electrophoretic dispersion liquid in a ratio of 30% to 60% wt. with respect to a weight of the electrophoretic dispersion liquid.

Thereby, the microcapsules are aligned with a good size precision, thus ensuring the prevention of display unevenness.

In addition, the binder having the 180° peel adhesion strength in the above range has an appropriate viscosity under room temperature. Accordingly, using the above binder ensures bonding (fixing) between the electrophoretic display sheet and an opposing substrate.

Furthermore, due to the appropriate ratio of the electrophoretic particles contained in the electrophoretic dispersion liquid, a good display performance can be maintained, as well as the migration velocity of the particles can be increased.

Preferably, in the display sheet of the first aspect, the electrophoretic particles include white particles and color particles having a tone different from that of the white particles; and a content ratio of the white particles ranges from 94% to 98% wt. with respect to a weight of the electrophoretic particles, whereas a content ratio of the color particles ranges from 2% to 6% wt. with respect to the weight of the electrophoretic particles.

In this manner, a surface area of the white particles is increased and also concealability of the color particles by extraneous light can be maintained, so that display contrast can be increased, resulting in the improvement of display quality.

Preferably, in the electrophoretic display sheet of the first aspect, hydrophobic treatment is applied to surfaces of the electrophoretic particles.

Thereby, the affinity of the particles for a liquid phase dispersion medium is improved, so that dispersibility of the particles can be improved. Thus, adhesion of the particles to an inner wall of the microcapsule can be prevented.

Preferably, in the electrophoretic display sheet of the first aspect, the white particles are made of titanium oxide subjected to silica/alumina treatment, whereas the color particles are made of carbon black.

Thereby, there are obtained a high white reflectance and a low black reflectance, so that display contrast can be further increased.

Preferably, in the electrophoretic display sheet of the first aspect, the binder has a melting point of 25° C. or lower.

The binder having the above melting point has sufficient fluidity at room temperature, which makes it easier to use the binder (the microcapsule dispersion liquid) at room temperature.

Preferably, in the electrophoretic display sheet of the first aspect, the binder includes (metha)acrylic acid ester.

The binder mainly made of (metha)acrylic acid ester is easily obtainable and has an appropriate viscosity under room temperature.

Preferably, in the electrophoretic display sheet above, the (metha)acrylic acid ester has a total carbon number ranging from 5 to 20.

The binder mainly made of the above (metha)acrylic acid ester has an appropriate viscosity under room temperature.

Preferably, in the electrophoretic display sheet of the first aspect, the shell includes a material that contains gelatin.

Thereby, flexibility of the microcapsule can be increased. Additionally, the above shell has a high affinity for (metha)acrylic acid ester favorably used as a binder, thus further increasing a strength of the binder to fix (retain) the microcapsule.

Preferably, in the electrophoretic display sheet of the first aspect, the electrophoretic dispersion liquid is prepared by dispersing the electrophoretic particles in a dispersion medium that contains liquid paraffin.

The dispersion medium mainly containing liquid paraffin (the liquid phase dispersion medium) is highly effective in suppressing cohesion among the electrophoretic particles and also has a low affinity (a low solubility) for the material of the shell.

Preferably, in the electrophoretic display sheet above, the liquid paraffin is isoparaffin.

Among various liquid paraffins, isoparaffin is particularly highly effective in suppressing the cohesion among the electrophoretic particles.

Preferably, in the electrophoretic display sheet above, the isoparaffin has a carbon number ranging from 5 to 15.

Using the isoparaffin with the number of carbons in the above range as the dispersion medium can prevent an unnecessary increase in the viscosity of the dispersion medium. Additionally, there are provided advantageous effects in which a specific gravity difference is small between the dispersion medium and the electrophoretic particles and a sedimentation velocity of the particles is sufficiently small. As a result, display performance (particularly, a response time and image retention properties) of the electrophoretic display can be improved.

An electrophoretic display according to a third aspect of the invention includes the electrophoretic display sheet of the first aspect and an opposing substrate provided on a side facing the surface side of the substrate having the microcapsule-containing layer provided thereon.

In this manner, a highly reliable electrophoretic display can be obtained.

Preferably, the electrophoretic display of the third aspect further includes an adhesive layer for bonding between the electrophoretic display sheet and the opposing substrate.

Thereby, the display sheet and the circuit board can be more surely fixed together.

Preferably, in the electrophoretic display above, the adhesive layer has insulating properties.

Thereby, a short circuit between the electrodes can surely be prevented, thus ensuring that an electric field is applied onto the electrophoretic particles.

Preferably, in the electrophoretic display of the third aspect, the adhesive layer has a function of preventing the diffusion of ions to the opposing substrate from the electrophoretic display sheet.

In this manner, a reduction in circuit characteristics, particularly, a reduction in those of a switching element can be prevented or suppressed.

Preferably, in the electrophoretic display of the third aspect, the adhesive layer has a function of absorbing and retaining water entering the electrophoretic display.

In this manner, even if water enters the electrophoretic display, the adhesive layer prevents or suppresses water diffusion to the microcapsules, circuits, and the like, so that degradation of the constituent elements in the display can be prevented.

Preferably, in the electrophoretic display of the third aspect, the adhesive layer has a function of reducing stress occurring upon the bonding between the electrophoretic display sheet and the opposing substrate.

This can prevent destruction of the microcapsule, the switching element, or the like in the process of producing (forming) the electrophoretic display.

Preferably, in the electrophoretic display of the third aspect, the adhesive layer is mainly made of polyurethane.

The adhesive layer mainly made of polyurethane can surely have the foregoing function.

Preferably, in the electrophoretic display of the third aspect, under a condition where a mean thickness of the adhesive layer is set to A μm and a mean thickness of the microcapsule-containing layer is set to B μm, a value of A/B ranges from 0.1 to 3.

This particularly makes it possible to improve the insulating properties and the function for reducing the stress occurring upon the bonding between the electrophoretic display sheet and the opposing substrate.

According to a fourth aspect of the invention, a method for producing an electrophoretic display includes preparing the electrophoretic display sheet of the first aspect and bonding an opposing substrate on a side facing the surface side of the substrate having the microcapsule-containing layer provided thereon, the bonding being performed under room temperature to move and relocate the microcapsules in the microcapsule-containing layer such that an arrangement density of the microcapsules is equalized.

The above method ensures the production of a highly reliable electrophoretic display.

Preferably, in the producing method according to the fourth aspect, when the bonding is performed, a thickness of the microcapsule-containing layer is reduced to deform the microcapsule.

Thereby, a more highly reliable electrophoretic display can easily and surely be produced.

An electronic apparatus according to a fifth aspect of the invention includes the electrophoretic display of the third aspect.

Thereby, a highly reliable electronic apparatus can be obtained.

BRIEF DESCRIPTION OF THE DRAWINGS

The invention will be described with reference to the accompanying drawings, wherein like numbers reference like elements.

DETAILED DESCRIPTION OF EMBODIMENTS

Hereinafter, embodiments of the invention will be described in detail with reference to the accompanying drawings.

Electrophoretic Display

First will be described an electrophoretic display (an electrophoretic display according to an embodiment of the invention) produced by applying an electrophoretic display sheet according to an embodiment of the invention.

Figure 1:
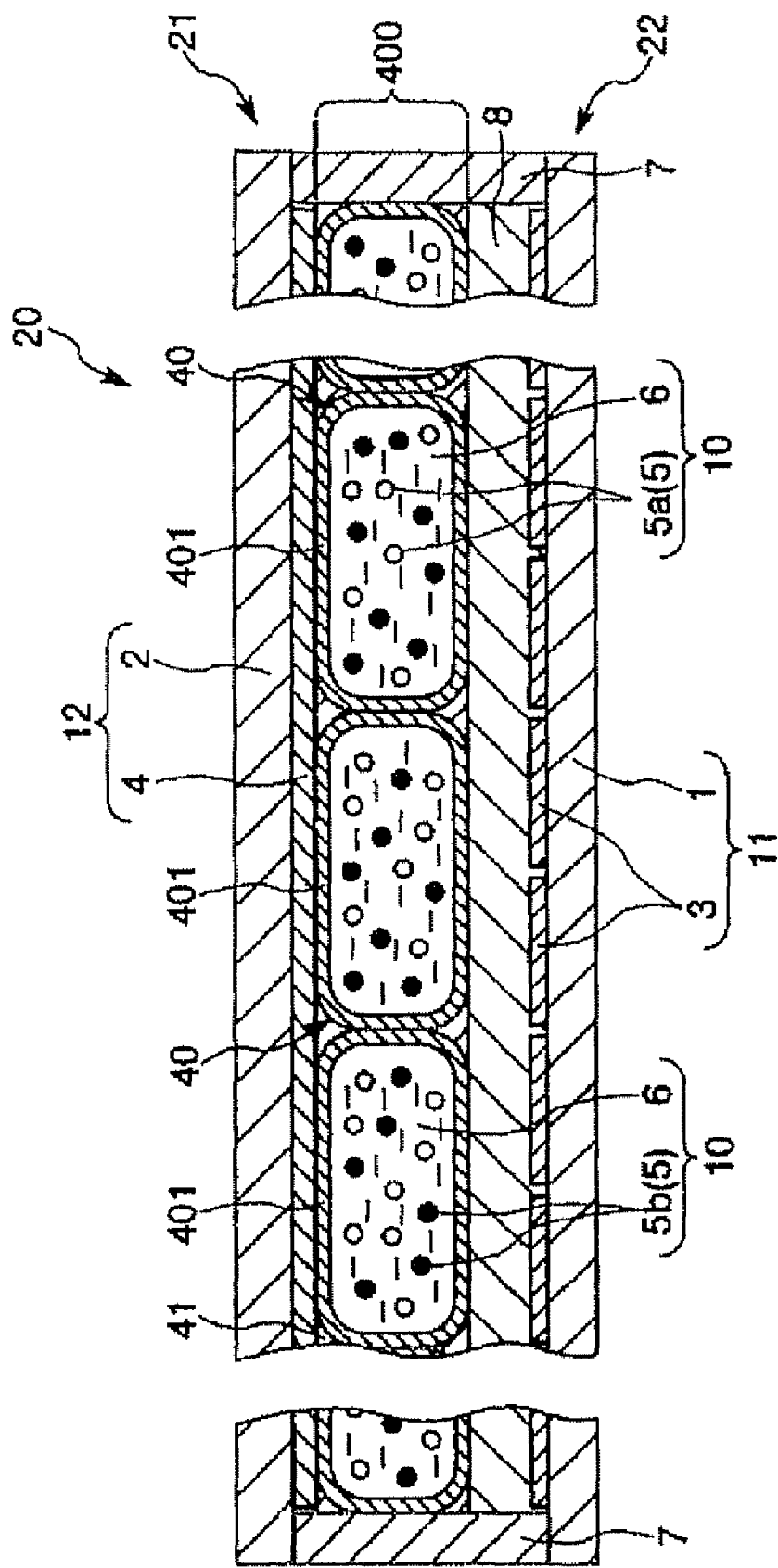
FIG. 1 schematically illustrates a longitudinal section of an electrophoretic display according to an embodiment of the invention.

FIG. 1 schematically illustrates a longitudinal section of the electrophoretic display according to the embodiment. For an illustrative convenience, upper and lower sides of FIG. 1 are referred to as "upper" and "lower", respectively, in the description below.

An electrophoretic display 20 shown in FIG. 1 includes an electrophoretic display sheet (a front plane) 21, a circuit board (a back plane) 22, an adhesive layer 8 for bonding between the electrophoretic display sheet 21 and the circuit board 22, and a sealing portion 7 for airtightly sealing a space between the display sheet and the circuit board.

The electrophoretic display sheet 21 includes a substrate 12 including a planar base 2, a second electrode 4 disposed on a lower surface of the base 2, and a microcapsule-containing layer 400 provided on a lower surface side of the substrate 12 (on a side facing one of surfaces thereof) to contain a plurality of microcapsules 40 and a binder 41.

Meanwhile, the circuit board 22 includes an opposing substrate 11 with a planar base 1 and a plurality of first electrodes 3 disposed on an upper surface of the base 1. Additionally, on the opposing substrate 11 (the base 1), there is provided, for example, a circuit (not shown) such as a switching element (e.g. a thin film transistor (TFT)).

Next, structures of the individual parts will be described in order.

The base 1 and the base 2 are each made of a sheet-shaped (planar) material, and serve to support and protect members arranged therebetween.

Each of the bases 1 and 2 may be made of either a flexible or rigid material. Preferably, a flexible material is used. Using the bases 1 and 2 each made of a flexible material enables production of the electrophoretic display 20 having flexibility, namely, of the electrophoretic display 20 useful to construct an electronic paper, for example.

When each of the bases (a base material layer) 1 and 2 is made of a flexible material, examples of a constituent material of the base include a polyolefin such as polyethylene, polypropylene, or ethylene-vinyl acetate copolymer, a liquid crystal polymer such as modified polyolefin, polyamide (e.g. nylon 6, nylon 46, nylon 66, nylon 610, nylon 612, nylon 11, nylon 12, nylon 6-12, or nylon 6-66), thermoplastic polyimide, or aromatic polyester, a thermoplastic elastomer such as polyphenylene oxide, polyphenylene sulfide, polycarbonate, polymethylmethacrylate, polyether, polyether ether ketone, polyether imide, polyacetal, styrene series, polyolefin series, polyvinyl chloride series, polyurethane series, polyester series, polyamide series, polybutadiene series, trans-polyisoprene series, fluorocarbon rubber series, or chlorinated polyethylene series, or a copolymer, a blend, or s polymer alloy mainly containing any thereof. Among them, one thereof or a combination of two or more thereof can be used.

A mean thickness of each of the bases 1 and 2 is appropriately determined in accordance with the constituent material thereof, a use purpose thereof and the like, and is not particularly restricted. A preferable mean thickness of each base having flexibility ranges from approximately 20 to 500 μm, and a more preferable mean thickness thereof ranges from approximately 25 to 250 μm. This can reduce a size of the electrophoretic display 20, particularly, a thickness thereof, while maintaining a balance between structural flexibility and strength of the display.

On a surface of each of the bases 1 and 2 facing the microcapsule 40, namely, on an upper surface of the base 1 and on the lower surface of the base 2, respectively, there are disposed the first electrode 3 and the second electrode 4, respectively, each of which forms a layer (a film).

When voltage is applied between the first and the second electrodes 3 and 4, an electric field is generated therebetween and acts on electrophoretic particles (display particles) 5.

In the present embodiment, the second electrode 4 is provided as a common electrode, whereas the first electrode 3 is provided as an individual electrode (a pixel electrode connected to the switching element) that is split in a matrix (an array in rows and columns). A single pixel is composed of a region where the second electrode 4 and one of the first electrodes 3 overlap each other.

The second electrode 4 may also be split into a plurality of electrodes, as in the first electrode 3.

Alternatively, both the first electrode 3 and the second electrode 4 may be split into a stripe pattern to be arranged such that they intersect each other.

A constituent material of each of the first and the second electrodes 3 and 4 is not particularly restricted as long as it is substantially conductive. Examples of the material thereof include various conductive materials: a metal such as copper, aluminum, nickel, cobalt, platinum, gold, silver, molybdenum, tantalum, or an alloy thereof; a carbon such as carbon black, carbon nanotube, or fullerene; an electron-conductive high polymer such as polyacetylene, polypyrrole, polythiophene, polyaniline, poly(p-phenylene), poly(p-phenylene vinylene), polyfluorene, polycarbazole, polysilane, or a derivative of any thereof; an ionic conductive high polymer obtained by dispersing an ionic substance such as NaCl, LiClO4, KCl, H2O, LiCl, LiBr, LiI, LiNO3, LiSCN, LiCF3SO3, NaBr, NaI, NaSCN, NaClO4, NaCF3SO3, KI, KSCN, KClO4, KCF3SO3, NH4I, NH4SCN, NH4ClO4, NH4CF3SO3, MgCl2, MgBr2, MgI2, Mg(NO3)2, MgSCN2, Mg(CF3SO3)2, ZnCl2, ZnI2, ZnSCN2, Zn(ClO4)2, Zn(CF3SO3)2, CuCl2, CuI2, CuSCN2, Cu(ClO4)2, or Cu(CF3SO3)2 into a matrix resin such as polyvinyl alcohol, polycarbonate, polyethylene oxide, polyvinyl butyral, polyvinyl carbazole, or polyvinyl acetate; or a conductive oxide such as indium tin oxide (ITO), fluorine-doped tin oxide (FTO), tin oxide (SnO2), or indium oxide (IO). Among the conductive materials, one of them, or two or more thereof can be used.

In addition to the above materials, other material candidates for each of the electrodes 3 and 4 may be composite materials that have conductivity added by mixing a conductive material (conductive particles) such as gold, silver, nickel, or carbon into a nonconductive material such as glass, rubber, or polymer.

As concrete examples of such composite materials, there may be mentioned a conductive rubber prepared by mixing a conductive material into a rubber material, a conductive adhesive or a conductive paste prepared by mixing a conductive material into any one of adhesive compositions such as epoxy series, urethane series, or acrylic series, or a conductive resin prepared by mixing a conductive material into a matrix resin such as polyolefin, polyvinyl chloride, polystyrene, ABS resin, nylon (polyamide), ethylene vinyl acetate copolymer, polyester, acrylic resin, epoxy resin, or urethane resin.

Mean thicknesses of the electrodes 3 and 4 are each appropriately determined in accordance with the constituent material, a use purpose thereof, and the like, and are not particularly restricted. The mean thickness of each thereof is preferably in a range of approximately 0.05 to 10 μm, and more preferably in a range of approximately 0.05 to 5 μm.

Among the bases 1, 2 and the electrodes 3, 4, the base and the electrode arranged on a display surface side (the base 2 and the second electrode 4 in the present embodiment) have optical transparency. That is, they are substantially transparent (colorless and transparent, colored and transparent, or semitransparent). This enables easy visual recognition of a state of the electrophoretic particles 5 in an electrophoretic dispersion liquid 10 described below, namely, of information (images) displayed on the electrophoretic display 20.

The electrodes 3 and 4 each have a single-layer structure composed of a simple substance as any one of the foregoing materials. However, other than the structure, for example, the electrodes may each have a multilayer lamination structure obtained by sequentially laminating each of a plurality of materials. In other words, for example, the electrodes 3 and 4 may have either a single-layer structure made of ITO or a double-layer lamination structure composed of an ITO layer and a polyaniline layer.

In the electrophoretic display sheet 21, the microcapsule-containing layer 400 is provided in contact with a lower surface of the second electrode 4.

In the microcapsule-containing layer 400, the binder 41 fixes (retains) the microcapsules 40 with a capsule main body (a shell) 401 for enclosing the electrophoretic dispersion liquid 10 therein.

The microcapsules 40 are arranged between the opposing substrate 11 and the substrate 12 in a single-layer structure such that they are arrayed in parallel to one another vertically and horizontally (one by one without overlapping each other in a thickness direction thereof).

In the present embodiment, the microcapsules 40, which are sandwiched by the second electrode 4 and the adhesive layer 8, are compressed vertically and expanded horizontally to be flattened. In other words, the microcapsules 40 form a stone-wall structure in a two-dimensional view.

Due to the above structure, in the electrophoretic display 20 having the structure as above, an effective display area is increased and thus image contrast is improved. Additionally, since a vertical movement distance of the electrophoretic particles 5 can be reduced, the particles can be moved and gathered near a predetermined electrode in a short time, as well as the response time can be increased.

Additionally, in the present embodiment, each one of the microcapsules 40 is arranged with respect to two adjacent ones of the first electrodes 3, In short, the single microcapsule 40 is located to extend over the two adjacent first electrodes 3.

Examples of a constituent material of each capsule main body (the shell) 401 include gelatin, a composite material of gum Arabic and gelatin, any one of various rein materials such as urethane series, melamine resin series, urea resin series, polyamide, and polyether. Among them, one thereof or a combination of two or more thereof can be used.

Above all, preferably, the capsule main body 401 is mainly made of a gelatin-containing material (particularly, a material that mainly contains gelatin). This can increase flexibility of the microcapsules 40, further ensuring the formation of the foregoing stone-wall structure. Additionally, as will be described below, gelatin has a good affinity for (metha)acrylic acid ester favorably used as the binder 41. Thus, gelatin is preferable also because it can further increase a strength of the binder 41 to fix (retain) the microcapsules 40.

As the preferable gelatins, there may be mentioned untreated gelatin, lime-treated gelatin, acid-treated gelatin, delimed gelatin with a reduced content of calcium or the like, gelatin prepared by reducing methionine residues by oxidation, and the like. One of them or a combination of two or more thereof can be used.

Additionally, in the constituent material of the capsule main body 401, a crosslinking (a three-dimensional crosslinking) may be formed by a crosslinking agent. Thereby, the capsule main body 401 can have an improved structural strength, while maintaining flexibility. This can prevent easy destruction of the main body.

Preferably, sizes of the above microcapsules 40 are approximately equalized, which can prevent or reduce display unevenness in the electrophoretic display 20. Consequently, the display can exhibit more excellent display performance.

The electrophoretic dispersion liquid 10 enclosed in the capsule main body 401 is prepared by dispersing (suspending) at least one kind of electrophoretic particles 5 (two kinds thereof containing color particles 5b and white particles 5a in the present embodiment) in a liquid phase dispersion medium 6.

The electrophoretic particles 5 can be dispersed in the liquid phase dispersion medium 6 by using one of or a combination of two or more of methods such as paint shaking, ball milling, media milling, supersonic dispersion, and stirring dispersion.

As the liquid phase dispersion medium 6, it is favorable to use a dispersion medium having a low solubility for the capsule main body 401 and having relatively high insulating properties.

Additionally, a migration velocity of the electrophoretic particles 5 can be expressed by an expression given below. Then, in order to improve the migration velocity and display responsiveness, it is necessary to reduce viscosity of the liquid phase dispersion medium 6. For this reason, the liquid phase dispersion medium 6 is preferably nonaqueous and less viscous.

$$V=(q/6\pi r\eta)\cdot E$$

(In the above expression, symbol "V" represents the migration velocity of the electrophoretic particles 5; "r" represents a radius of the electrophoretic particles 5; "q" represents an electric charge of the electrophoretic particles 5; "η" represents a viscosity of the liquid phase dispersion medium 6; and "E" represents a strength of an electric-field applied onto the electrophoretic particles 5.)

Examples of the liquid phase dispersion medium 6 include alcohols such as methanol, ethanol, isopropanol, butanol, octanol, ethylene glycol, diethylene glycol, and glycerin; cellosolves such as methyl cellosolve, ethyl cellosolve and phenyl cellosolve, ester such as methyl acetate, ethyl acetate, butyl acetate, and methyl formate; ketones such as acetone, methylethyl ketone, diethyl ketone, methyl isobutyl ketone, methyl isopropyl ketone, and cyclohexanone; aliphatic hydrocarbons (liquid paraffins) such as pentane, hexane, and octane; cycloalkanes such as cyclohexane and methyl cyclohexane; aromatic hydrocarbons having long-chain alkyl groups such as benzene, toluene, xylene, hexylbenzene, heptylbenzen, octylbenzene, nonylbenzene, decylbenzene, undecylbenzene, dodecylbenzene, tridecylbenzene, and tetradecylbenzene; halogenated hydrocarbons such as methylene chloride, chloroform, carbon tetrachloride, and 1,2-dichloroethane; hetero aromatic compounds such as pyridine, pyrazine, furan, pyrrole, thiophene, and methyl pyrrolidone; nitrites such as acetonitrile, propionitrile, and acrylonitrile; amides such as N,N-dimethylformamide and N,N-dimethylacetamide; carboxylates; and other various oils. One of them or a mixture thereof can be used.

Among them, as the liquid phase dispersion medium 6, preferably, those mainly made of aliphatic hydrocarbons (liquid paraffins) can be used. This is because the dispersion medium 6 mainly containing liquid paraffin is highly effective in suppressing cohesions among the electrophoretic particles 5, as well as has a low affinity (the low solubility) for the constituent material of the capsule main body 401. This can more surely prevent or suppress the aging degradation of display performance in the electrophoretic display 20. In addition, liquid paraffins have no unsaturated bonds and thus exhibit excellent climate resistance, with a superior level of safety.

Furthermore, among the aliphatic hydrocarbons (liquid paraffins), particularly, it is preferable to use branched aliphatic hydrocarbons (isoparaffins). Isoparaffins are particularly highly effective in suppressing the cohesions among the electrophoretic particles 5.

In addition, such an isoparaffin preferably has a carbon number ranging from 5 to 15, and more preferably has a carbon number ranging from 8 to 15. Using any of the isoparaffins having the number of carbons in the above range as the liquid phase dispersion medium 6 can prevent an unnecessary increase in viscosity of the dispersion medium 6 (the electrophoretic dispersion liquid 10). Additionally, there can be provided advantageous effects in which a specific gravity difference is small between the dispersion medium and the electrophoretic particles, and a sedimentation velocity of the particles is sufficiently small. As a result, the display performance (particularly, the response velocity and the retention properties) of the electrophoretic display 20 can be improved.

In this case, either one of the isoparaffins or a mixture of two or more thereof can be used.

Additionally, if necessary, it is possible to add any one of additives such as dispersants, lubricants, and stabilizers into the liquid phase dispersion medium 6 (the electrophoretic dispersion liquid 10). Examples of the additives include charge-control agents made of particles of electrolytes, anionic or cationic surfactants, metal soaps, resins, rubbers, oils, varnishes, compounds or the like, titanium-coupling agents, aluminum-coupling agents, and silane-coupling agents.

As examples of the surfactants, there may be mentioned alkenyl succinic ester, alkenyl succinic polyimide, and the like.

Adding an additive such as any of the dispersion agents in the liquid phase dispersion medium 6 allows the electrophoretic particles 5 to be evenly dispersed therein. Thus, dispersibility of the electrophoretic particles 5 can be improved, which can prevent adhesion of the particles to inner walls of the microcapsules 40. In addition, a desired amount of charge can be obtained.

Furthermore, according to needs, various pigments may be dissolved, such as anthraquinone pigments, azo pigments, indigoid pigments, triphenylmethane pigments, pyrazolone pigments, stilbene pigments, diphenylmethane pigments, xanthene pigments, alizarin pigments, acridine pigments, quinoneimine pigments, thiazole pigments, methine pigments, nitro pigments, and nitroso pigments.

A ratio of the liquid phase dispersion medium 6 contained in the electrophoretic dispersion liquid 10 is preferably in a range of 40 to 70% wt. with respect to a weight of the electrophoretic dispersion liquid 10, and more preferably in a range of 45 to 65% wt. with respect thereto.

When the content ratio of the liquid phase dispersion medium 6 is in the above range, the electrophoretic particles 5 can be dispersed in the microcapsules 40 in an appropriate density, so that the migration velocity of the particles can be increased.

If the content ratio of the dispersion medium 6 is below a lower limit of the above range, the content ratio of the electrophoretic particles 5 is increased, which can restrict the migration of the particles.

Conversely, if the content ratio thereof exceeds an upper limit of the range, the ratio of the contained particles is decreased, which can cause display unevenness.

The electrophoretic particles 5 are not particularly restricted as long as they have electric charges and can be migrated in the liquid phase dispersion medium 6 by the application of an electric field. Among pigment particles, resin particles, and composite particles, preferably at least one kind thereof can be used. Those kinds of particles are advantageous because of easy production and relatively easy charge control.

As examples of pigments of the pigment particles, there may be mentioned black pigments such as aniline black, carbon black, and titan black; white pigments such as titanium oxide, antimony oxide, barium sulfate, zinc sulfide, zinc white, silicon oxide, and aluminum oxide; azo pigments such as monoazo, disazo, and polyazo; yellow pigments such as isoindolynone, yellow lead, yellow iron oxide, cadmium yellow, titan yellow, and antimony; red pigments such as quinacridone red and chrome bar million; blue pigments such as phthalocyanine blue, induslene blue, ion blue, ultramarine blue, and cobalt blue; and green pigments such as phthalocyanine green. One of them or a combination of two or more thereof can be used.

For example, materials of the resin particles may be acrylic resin, urethane resin, urea resin, epoxy resin, polystyrene, polyester, and the like. One of them or a combination of two or more thereof can be used.

As the composite particles, for example, there may be mentioned those including pigment particles having surfaces coated with a resin or any other pigment, those including the resin particles having surfaces coated with a pigment, those including a mixture of a pigment and a resin prepared in an appropriate composition ratio, or the like.

As the particles including the pigment particles having the surfaces coated with another pigment, for example, there may be mentioned optically inactive rutile titanium dioxide, in which the surfaces of titanium oxide particles are coated with silicon oxide or aluminum oxide. The rutile titanium dioxide particles are favorably used as the white particles 5a.

In addition, carbon black particles, titanium black particles, or particles having surfaces coated with either one of them are favorably used as the color particles (black particles) 5b.

The amount of charge of the electrophoretic particles 5 can be controlled, for example, by forming a polymer grafted layer including a high polymer on the surfaces of the electrophoretic particles 5 and adjusting the density of a polar group introduced into the grafted layer. In this case, preferably, the high polymer included in the polymer grafted layer has a high compatibility with the liquid phase dispersion medium 6.

Thereby, the affinity of the electrophoretic particles 5 for the liquid phase dispersion medium 6 can be improved, which can reduce resistance imparted to the electrophoretic particles 5 during their migration in the dispersion medium. As a result, it is possible to improve dispersibility of the electrophoretic particles 5 in the dispersion medium, thereby preventing adhesion of the particles onto the inner walls of the microcapsules 40.

Examples of the above high polymer include various coupling agents.

Additionally, although the shape of the electrophoretic particles 5 is not particularly restricted, it is preferably spherical.

A mean particle size of the electrophoretic particles 5 is preferably in a range of approximately 10 to 500 nm, and more preferably in a range of approximately 20 to 300 nm. Using the electrophoretic particles 5 having the mean particle size in the above range can surely prevent cohesions among the particles and their sedimentations in the dispersion medium 6. Consequently, display quality degradation in the electrophoretic display 20 can favorably be prevented.

As in the present embodiment, in the case of using two different kinds of particles as the electrophoretic particles 5, the particles preferably have different mean particle sizes, and particularly, the white particles 5a preferably have a mean particle size larger than that of the color particles 5b. This can farther improve display contrast and image retention properties in the electrophoretic display 20.

Specifically, the color particles 5b preferably have a mean particle size ranging from approximately 20 to 100 nm, whereas the white particles 5a preferably have a mean particle size ranging from approximately 150 to 300 nm.

A preferable ratio of the electrophoretic particles 5 contained in the liquid phase dispersion medium 6 is in a range of 30 to 60% wt. with respect to the weight of the electrophoretic dispersion liquid 10, and a more preferable ratio thereof is in a range of 35 to 55% wt. with respect thereto.

When the content ratio of the electrophoretic particles 5 is in the above range, the particles can be dispersed in the microcapsules 40 in an appropriate density, so that the migration velocity thereof can be increased.

If the content ratio of the particles is below a lower limit of the above range, it is a small amount of the particles that moves toward the display surface side, so that display unevenness can occur.

Particularly, in a case where the above electrophoretic particles 5 are the white particles 5a, the white particles 5a cannot sufficiently diffuse light, so that the adhesive layer 8 is likely to be seen through.

If the content ratio of the electrophoretic particles 5 exceeds an upper limit of the range, a migration space for the individual particles is restricted, which can make it difficult for them to migrate. As a result, since the particle migration velocity becomes slow, display response time is likely to be long.

Particularly, in a case of the electrophoretic particles 5 migrating at −20° C., the electrophoretic dispersion liquid 10 becomes gel and thus the particles cannot migrate.

A ratio of the white particles 5a contained in the electrophoretic particles 5 preferably ranges from 94 to 98% by weight (wt.) with respect to a weight of the electrophoretic particles 5, and more preferably ranges from 95 to 97% wt. with respect thereto.

When the ratio of the contained white particles 5a is in the above range, a surface area of the white particles is increased, which can increase reflectance of the white particles.

If the ratio of the white particles 5a is below a lower limit of the above range, the surface area thereof is decreased, which can reduce the reflectance thereof.

A ratio of the color particles 5b contained in the electrophoretic particles 5 preferably ranges from 2 to 6% wt. with respect to the weight of the electrophoretic particles 5, and more preferably ranges from 3 to 5% wt. with respect thereto.

When the ratio of the color particles 5b is in the above range, concealability of the color particles 5b by extraneous light can be maintained, so that pigment reflectance can appropriately be controlled.

If the ratio of the contained color particles 5b is greater than 0% wt. and smaller than 2% wt., the concealability of the color particles 5b by extraneous light becomes insufficient, whereby pigment color purity is likely to be degraded. As a result, contrast is reduced and also image quality can be reduced when display images are visually recognized.

If the ratio of the contained color particles 5b exceeds an upper limit of the above range, the foregoing concealability becomes too high, so that white color purity is likely to be reduced. Consequently, contrast degradation occurs and image quality degradation can be found upon visual recognition.

As described above, when the ratios of both the white particles 5a and the color particles 5b contained in the electrophoretic particles 5 satisfy the respective ranges indicated above, white color reflectance can be increased and pigment reflectance can appropriately be controlled. Thus, contrast can be further improved. Consequently, the display quality of the electrophoretic display 20 can be further improved. The improvement is particularly noticeable when the color particles 5b are black ones.

A preferable white color reflectance is 30% or higher, whereas a preferable pigment reflectance, particularly, a preferable black reflectance is 5% or lower.

In the electrophoretic display 20 as described above, when a voltage is applied between the first and the second electrodes 3 and 4, the electrophoretic particles 5 (the color particles 5b and the white particles 5a) migrate toward either one of the electrodes in response to an electric field generated therebetween.

Figure 2A:
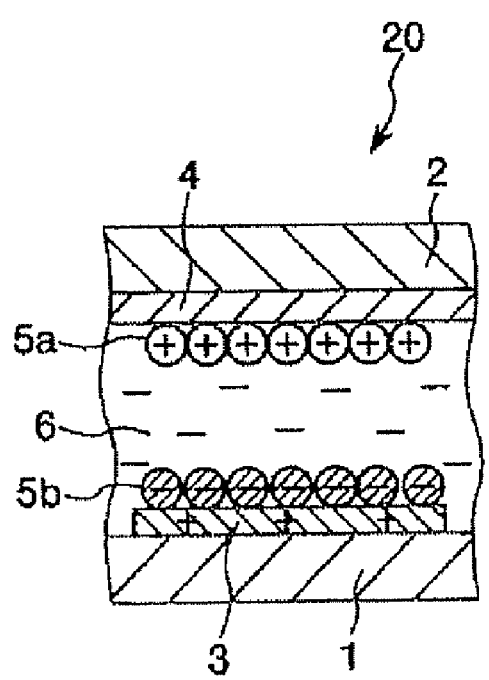
FIGS. 2A and 2B schematically illustrate an operating principle of the electrophoretic display shown in FIG. 1.

For example, as in FIG. 2A, when the white particles 5a are positively charged and the color particles (black particles) 5b are negatively charged, under a condition where the first electrode 3 is at a positive potential, the white particles 5a migrate toward the second electrode 4 to gather thereat, whereas the color particles 5b migrate toward the first electrode 3 to gather thereat. Consequently, when the electrophoretic display 20 is viewed from an upper side (the display surface side), the color of the white color particles 5a is seen.

Figure 2B:
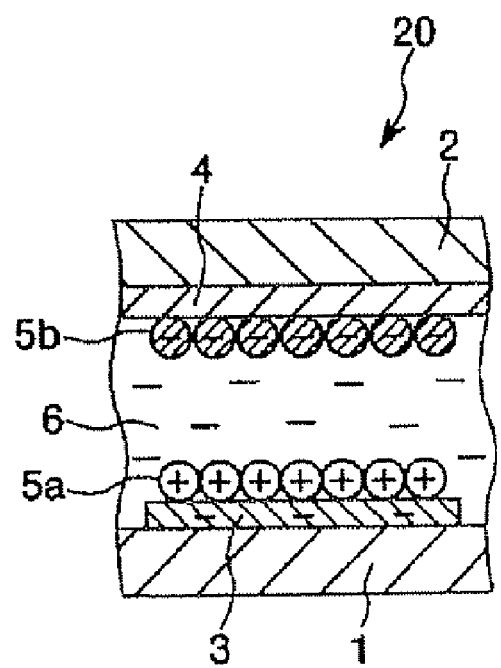

Conversely, as shown in FIG. 2B, under a condition where the first electrode 3 is at a negative potential, the white particles 5a migrate toward the first electrode 3 to gather thereat, whereas the color particles 5b migrate toward the second electrode 4 to gather thereat. Consequently, when the electrophoretic display 20 is viewed from the display surface side, the color of the color particles 5b, namely, the black color thereof is seen.

In the above arrangement, the amount of charge of the electrophoretic particles 5 (the white particles 5a and the color particles 5b), a polarity of each of the electrodes 3 and 4, the potential between the electrodes 3 and 4, and the like are appropriately determined. Thereby, on the display surface of the electrophoretic display 20, intended information (images) can be displayed in accordance with color combinations of the white particles 5a and the color particles 5b, the number of the particles gathering at each of the electrodes 3 and 4, and the like.

In addition, preferably, the specific gravity of the electrophoretic particles 5 is set to be approximately equal to that of the liquid phase dispersion medium 6. In this manner, even after voltage is tapped off between the electrodes 3 and 4, the electrophoretic particles 5 can remain at the same position for a long time in the dispersion medium 6. In short, the information displayed on the electrophoretic device 20 can be retained for a long time.

The binder 41 has a function of fixing the microcapsules 40 (retaining a positional relationship between the microcapsules 40). The present embodiment employs the binder 41 having viscosity under room temperature. In this case, the "viscosity" is referred to as a property that exhibits a relatively high viscosity, while maintaining fluidity.

Using the above binder 41 prevents solidification or hardening of the binder itself under room temperature, thereby maintaining the fluidity thereof. Accordingly, the microcapsules 40 can be moved (relocated) in the microcapsule-containing layer 400.

Thus, for example, even if the microcapsule-containing layer 400 includes a region with the microcapsules 40 overlapping each other and a region without the microcapsules 40 located, an arrangement density thereof in the layer can be equalized by moving the microcapsules 40. Additionally, equalizing the arrangement density thereof ensures contacts between the microcapsules 40, so that the foregoing stonewall structure can more surely be formed.

In addition, using the above binder 41 also provides an advantage that the microcapsules 40 can easily be relocated when bonding between the electrophoretic display sheet 21 and the circuit board 22, as will be described below.

Furthermore, selecting the binder 41 with a higher viscosity can also provide a function of fixing (bonding) between the sheet and the circuit board to the binder itself.

Furthermore, since the binder 41 maintains its fluidity under room temperature, no dispersion medium is needed to prepare the microcapsule dispersion liquid for forming the microcapsule-containing layer 400. This can prevent disadvantages caused by a dispersion medium remaining in the microcapsule-containing layer 400, such as a bleed-out of the liquid phase dispersion medium from the microcapsules and contrast degradation in the electrophoretic display.

Particularly, in the known technique, it is widely common that an emulsion adhesive is used as a binder and water is used as a dispersion medium for preparing a microcapsule dispersion liquid. However, when the dispersion medium is water, problems occur, such as degeneration or degradation of the capsule main body due to moisture absorption. Additionally, in a case of using an organic TFT as the switching element on the circuit board 22, the moisture absorption also causes degeneration or degradation of an organic semiconductor layer. These problems lead to the display quality degradation of the electrophoretic display.

Unlike the known displays, the present embodiment have no such problems in the electrophoretic display 20, because no water is needed for preparation of the microcapsule dispersion liquid.

Preferably, the binder 41 has a melting point or a glass transition temperature of 25° C. or lower, and more preferably, of 20° C. or lower. The binder 41 with the above melting point (o the glass transition temperature) has sufficient fluidity under room temperature, which makes it easy to use the binder 41 (as the microcapsule dispersion liquid) under room temperature. Additionally, the microcapsules 40 can be relatively freely moved in the binder 41.

Preferably, the binder 41 has a 180-degree peel adhesion strength (in accordance with JIS-K-6854) ranging from approximately 5N/25 to 150N/25 mm, and more preferably, ranging from approximately 25N/25 to 125N/25 mm. The binder 41 having the 180-degree peel adhesion strength in the above range exhibits an appropriate viscosity under room temperature. Accordingly, using the above binder 41 enables reliable bonding (fixing) between the electrophoretic display sheet 21 and the circuit board 22.

Examples of the above binder 41 include (metha)acrylic acid ester, laurate ester, and stearate ester. One of them or a combination of two or more thereof can be used as the binder 41.

Examples of the (metha)acrylic acid ester include a (metha)acrylic acid ester having a normal chain alkyl group, a (metha)acrylic acid ester having a branched alkyl group, a (metha)acrylic acid ester having an unsaturated alkyl group, a polyfunctional (metha)acrylic acid ester having a functional group different from a (metha)acrylic acid ester, such as a glycidyl group (epoxy ring), and a polyfunctional (metha)acrylic acid ester having a plurality of (metha)acrylic groups.

Among them, preferably, the binder 41 is mainly made of any one of the (metha)acrylic acid esters. The binder 41 mainly containing the (metha)acrylic acid ester is easily obtainable and has an appropriate viscosity under room temperature.

In addition, the (metha)acrylic acid ester preferably has a total carbon number ranging from 5 to 20, and more preferably has a total carbon number ranging from 8 to 16. Particularly, much more preferably, it is mainly composed of at least one of dodecyl(metha)acrylate and 2-ethylhexyl(metha)acrylate. The binder 41 mainly made of any of the above (metha)acrylic acid esters has an appropriate viscosity under room temperature.

Additionally, the binder 41 preferably has a dielectric constant approximately equal to that of the liquid phase dispersion medium 6. In this case, for example, a dielectric constant adjuster may be added into the binder 41. The adjuster may be any one of alcohols such as 1,2-butanediol and 1,4-butanediol, ketones, and carboxylate.

In the present embodiment, the electrophoretic display sheet 21 and the circuit board 22 are bonded together by the adhesive layer 8 interposed therebetween, thereby further ensuring the fixing between the sheet and the circuit board.

In addition to the bonding (fixing) between the display sheet 21 and the circuit board 22, the adhesive layer 8 preferably has an insulating function (I), a function of preventing the diffusion of ions from the sheet 21 to the circuit board 22 (II), a function of absorbing and retaining water entering the electrophoretic display 20 (III), and a function of reducing stress occurring upon the bonding between the sheet 21 and the circuit board 22 (IV).

When the adhesive layer 8 has the function I, it can surely prevent a short circuit between the first and the second electrodes 3 and 4, thereby ensuring application of an electric field on the electrophoretic particles 5. The function II can prevent or suppress the reduction of characteristics of a circuit (particularly, the switching element) disposed on the circuit board 22. The function III can prevent or suppress the diffusion of water entering the display 20 to the microcapsules 40, the circuit, or the like disposed on the circuit board 22, thereby preventing degradation of the components. In addition, the function IV can prevent destruction of the microcapsules 40, the switching element and the like disposed on the circuit board 22 in the process of producing (forming) the electrophoretic display 20.

Preferably, the adhesive layer 8 has at least one of the above functions I to IV, more preferably arbitrary two or more thereof, and still more preferably all thereof. Thereby, the electrophoretic display 20 can have further improved reliability and durability.

Preferably, the adhesive layer 8 is mainly made of polyurethane, because polyurethane can surely provide the foregoing functions to the layer.

The polyurethane may contain, for example, at least one of tetramethyl xylene diisocyanate (TMXDI), hexamethylene diisocyanate (HMDI), hydrogenerated diphenylmetane, diisocyanate (12H-MDI), and derivatives thereof, as an isocyanate component, and at least one of polypropylene glycol (PPG), polytetramethylene glycol (PTMG), 1,6-hexanediol (HD), bis(hydroxymethyl)propionate (BHMPCA), and derivatives thereof, as a polyol component.

Additionally, the polyurethane may contain EO-denatured dicyclopentenyl(metha)acrylate as another component. Then, since the binder 41 favorably contains the (metha) acrylate ester as described above, an adhesion between the (metha-)acrylate and the another component, namely, an adhesion between the microcapsule-containing layer 400 and the adhesive layer 8 can be improved.

As alternatives to polyurethane, examples of the constituent material of the adhesive layer 8 include thermoplastic resins such as polyethylene, chlorinated polyethylene, copolymers of ethylene and vinyl acetate, copolymers of ethylene and ethyl acrylate, polypropylene, AS resin, ABS resin, methyl methacrylate resin, vinyl chloride resin, copolymers of vinyl chloride and vinyl acetate, copolymers of vinyl chloride and vinylidene chloride, copolymers of vinyl chloride and acrylic acid ester, copolymers of vinyl chloride and methacrylic acid, copolymers of vinyl chloride and acrylonitrile, copolymers of ethylene, vinyl alcohol and vinyl chloride, copolymers of propylene and vinyl chloride, vinylidene chloride resin, vinyl acetate resin, polyvinyl alcohol, polyvinyl formal, and cellulose resins; polymers such as polyamide resin, polyacetal, polycarbonate, polyethylene terephthalate, polybutylene terephthalate, polyphenylene oxide, polysulfone, polyamideimide, polyamino-bismaleimide, polyether sulfone, polyphenylene sulfone, polyalylate, grafted polyphenylene-ether, polyether ether-ketone, and polyether-imide; fluoro-resins such as polytetrafluoroethylene, polyethylenepropylene fluoride, copolymers of tetrafluoroethylene and perphloroalkoxyethylene, copolymers of ethylene and tetrafluoroethylene, poly-vinylidene fluoride, polychlorotrifluoroethylene, and fluororubber; silicone-series resins such as silicone resin and silicone rubber. Additionally, there may be mentioned resin materials such as copolymers of methacrylic acid and styrene, polybutylene, and copolymers of methyl methacrylic acid, butadiene and styrene. Among them, one thereof or a combination of two or more thereof can be used.

When a mean thickness of the adhesive layer 8 is set to A μm and a mean thickness of the microcapsule-containing layer 400 is set to B μm, a value of A/B preferably ranges from 0.1 to 3, and more preferably ranges from 0.5 to 2.0. Thereby, particularly, the functions I and IV described above can be improved. Specifically, the mean thickness of the adhesive layer 8 is preferably in a range of approximately 1 to 30 μm, and more preferably in a range of approximately 5 to 20 μm.

Between the bases 1 and 2 is provided the sealing portion 7 along edges of the bases. The sealing portion 7 air tightly seals the electrodes 3, 4, the microcapsule-containing layer 400, and the adhesive layer 8. This can prevent infiltration of water into the electrophoretic display 20, thereby further ensuring the prevention of display performance degradation in the electrophoretic display 20.

As a constituent material of the sealing portion 7, for example, there may be mentioned resin materials including thermoplastic resins such as acrylic resin, urethane resin, olefin rein, and thermosetting resins such as epoxy resin, melamine resin, and phenol resin. One of them or a combination of two or more thereof can be used.

The sealing portion 7 is provided if needed, and can be omitted if not.

The electrophoretic display 20 structured as above can be produced as follows.

Hereinafter, a description will be given of a method for producing the electrophoretic display 20 (a method for producing the electrophoretic display according to an embodiment of the invention).

FIGS. 3 and 4 schematically illustrate the method for producing the electrophoretic display shown in FIG. 1. In the following description, upper and lower sides in FIGS. 3 and 4 are referred to as "upper" and "lower", respectively.

1. Preparation Process of the Electrophoretic Dispersion Liquid 10

The electrophoretic particles 5 and the liquid phase dispersion medium 6 are mixed to obtain the foregoing content ratio thereof so as to prepare the electrophoretic dispersion liquid 10.

2. Production Process of the Microcapsules 40

First, the microcapsules 40 are produced, each of which encloses the electrophoretic dispersion liquid 10.

A method for producing each microcapsule 40 (a method for enclosing the electrophoretic dispersion liquid 10 in each capsule main body 401) is not particularly restricted. As various microencapsulation processes, for example, there may be mentioned an interfacial polymerization process, an In-Situ polymerization process, a phase separation process (or coacervation), an interfacial precipitation method, a spray dry process, and the like. An appropriate micro-encapsulation process can be selected in accordance with the constituent material of the microcapsule 40 and the like.

The microcapsules 40 having an equalized size can be obtained, for example, by sieving the microcapsules and separating those with an equal size, by filtration, or by specific gravity difference separation.

Preferably, a mean particle size of the microcapsules 40 ranges from approximately 5 to 50 μm, and more preferably it ranges from approximately 10 to 30 μm. Setting the mean particle size of the microcapsules 40 within the above range further ensures control of the migration of the electrophoretic particles 5 in the electrophoretic display 20 produced.

3. Preparation Process of the Microcapsule Dispersion Liquid

Next, the microcapsules 40 produced in the above manner and the binder 41 having viscosity under room temperature are mixed together to prepare the microcapsule dispersion liquid.

A content ratio of the microcapsules 40 in the microcapsule dispersion liquid preferably ranges from approximately 10 to 80% wt., and more preferably ranges from approximately 30 to 60% wt.

When the amount of the contained microcapsules 40 is in the above range, it is very advantageous in that the microcapsules 40 can be moved (relocated) in the microcapsule-containing layer 400 such that they do not overlap each other in the thickness direction thereof (in a single-layer structure).

4. Formation Process of the Microcapsule-Containing Layer

Figure 3A:
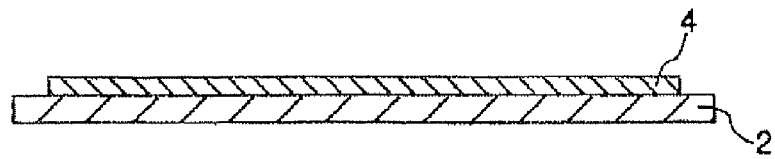
FIGS. 3A to 3D schematically illustrate a method for producing the electrophoretic display shown in FIG. 1.
Figure 3B:
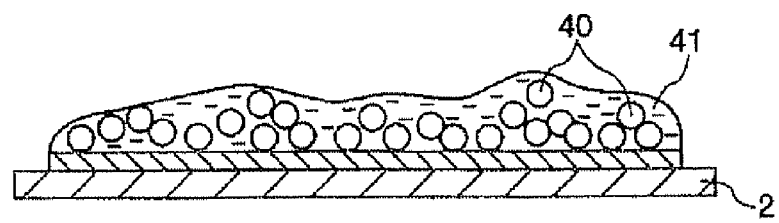

Next, as shown in FIG. 3B, the microcapsule dispersion liquid is supplied on the substrate 12.

As a method for supplying the microcapsule dispersion liquid, for example, there may be mentioned coating methods such as spin-coating, dip-coating, and spray coating by using a coater.

Next, according to needs, on each part of the substrate 12, the microcapsule dispersion liquid is equalized such that a thickness (an amount) of the dispersion liquid is equal, and preferably, such that the microcapsules 40 do not overlap each other in the thickness direction so as to be arranged one by one (in the single-layer structure).

Figure 3C:
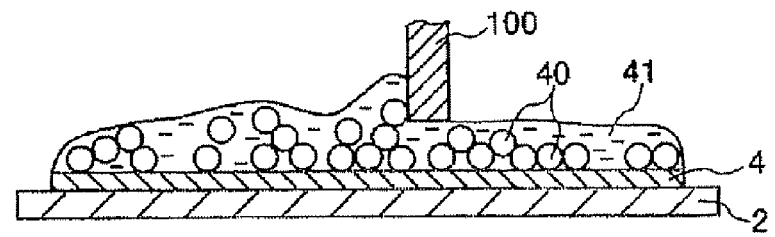

For example, as shown in FIG. 3C, the above process can be performed by running a squeegee (a planar jig) 100 across the substrate 12 to level the microcapsules 40.

Figure 3D:
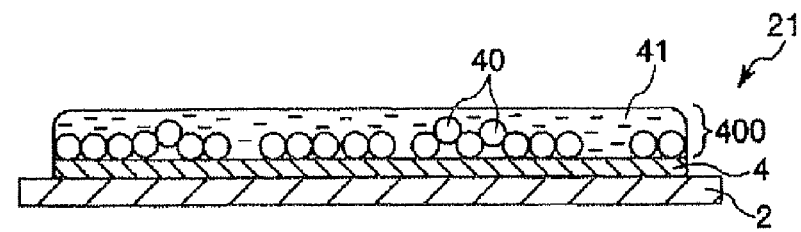

In this manner, the microcapsule-containing layer 400 is formed, whereby the electrophoretic display sheet 21 can be produced as shown in FIG. 3D (First Step).

In this situation, the microcapsules 40 can be freely moved in the binder 41.

5. Bonding Process of the Circuit Board 22 (Second Step)

Figure 4E:
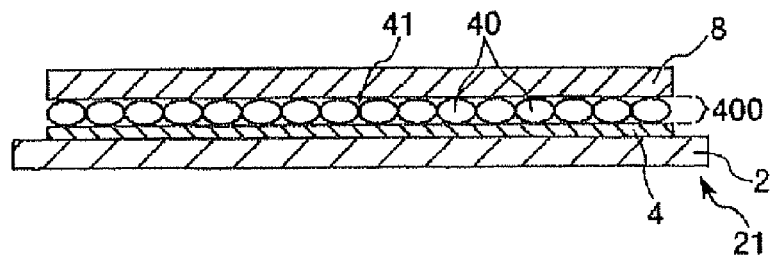
FIGS. 4E to 4G schematically illustrate the method for producing the electrophoretic display by following FIG. 3D.

Next, as shown in FIG. 4E, the adhesive layer 8 is formed on the microcapsule-containing layer 400.

The adhesive layer 8 can be formed by placing a sleet-shaped layer on the microcapsule-containing layer 400 by transferring or the like.

A preferable thickness of the adhesive layer 8 may be in a range of 5 to 20 μm.

Figure 4F:
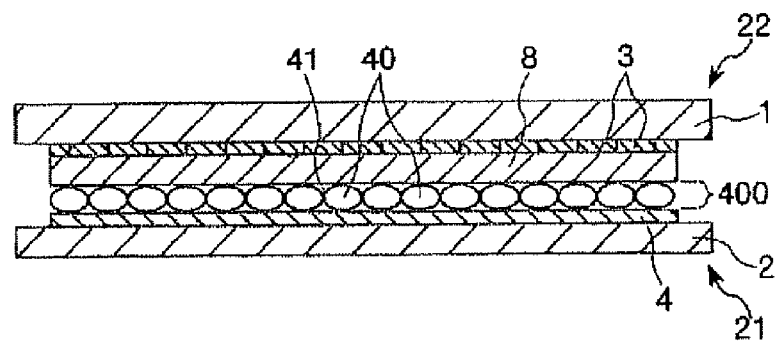

Next, as shown in FIG. 4F, the circuit board 22 separately prepared is overlapped on the adhesive layer 8 such that the first electrode 3 is in contact with the adhesive layer 8.

In this manner, the electrophoretic display sheet 21 and the circuit board 22 are bonded together by the adhesive layer 8 there between.

The present embodiment employs the binder 41 having viscosity (fluidity and viscosity) under room temperature. Thus, when performing the second step under room temperature, the binder 41 maintains fluidity. In the microcapsule-containing layer 400, even if there is a region with the microcapsules 40 overlapping each other or a region without the microcapsules 40, placing the adhesive layer 8 on the microcapsule-containing layer 400 allows the microcapsules 40 protruding upward to be pressed downward and moved. Then, the pressed and moved microcapsules 40 press the other microcapsules 40 there around to move them. As a result, in the microcapsule-containing layer 400, the microcapsules 40 are relocated such that the arrangement density thereof is equalized.

In this case, the microcapsules 40 can be deformed by using weights of the adhesive layer 8 and the circuit board 22, or by applying pressure such that the circuit board 22 comes in contact with the electrophoretic display sheet 21 if needed (by reducing the thickness of the microcapsule-containing layer 400).

In this manner, in each part of the microcapsule-containing layer 400, the arrangement density of the microcapsules 40 can be equalized, as well as the stone-wall structure (the flattened structure) composed of the microcapsules 40 can be surely formed. As a result, the electrophoretic display 20 can exhibit excellent display performance in terms of contrast, the response time, and the like.

In the present embodiment, the bonding between the display sheet 21 and the circuit board 22 does not require the application of pressure. This can prevent both the bleed-out of the electrophoretic dispersion liquid from the microcapsules 40 and the influence of pressure application on the circuit board 22.

Additionally, the adhesive layer 8 may be disposed on the circuit board 22 in advance and then the circuit board with the layer may be bonded to the display sheet. Alternatively, the adhesive layer 8 may be disposed on both the circuit board and the display sheet in advance, and the circuit board and the display sheet each having the adhesive layer 8 may be bonded together.

In order to place the adhesive layer 8 on the microcapsule-containing layer 400, for example, preferably, after a first end portion of the sheet-shaped adhesive layer 8 is initially contacted with the microcapsule-containing layer 400 while bending the layer 8, the remaining part of the layer 8 is sequentially contacted with the layer 400 toward a second end portion thereof. This can prevent the occurrence of air bubbles between both the layers and more surely enables relocation of the microcapsules 40.

6. Sealing Process

Figure 4G:
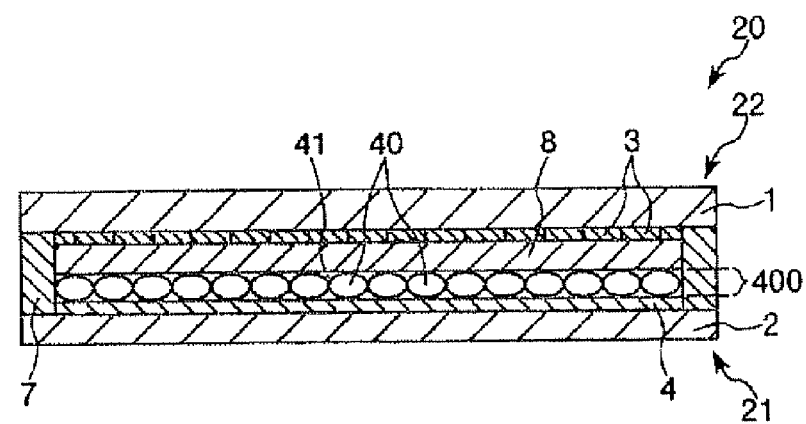

Next, as shown in FIG. 4G, the sealing portion 7 is formed along edges between the electrophoretic display sheet 21 and the circuit board 22.

In this step, between the sheet 21 (the base 2) and the circuit board 22 (the base 1), a material for forming the sealing portion 7 is supplied along the edges thereof, for example, by using a dispenser. Then, the supplied material is solidified or hardened so as to form the sealing portion 7.

Through the processes described above, the electrophoretic display 20 can be produced.

Electronic Apparatus

The electrophoretic display 20 produced as above can be incorporated in various electronic apparatuses. Hereinafter, a description will be given of an electronic apparatus equipped with the electrophoretic display 20 according to an embodiment of the invention.

1. Electronic Paper

First will be described an embodiment in which the electronic apparatus of the embodiment is applied to an electronic paper.

Figure 5:
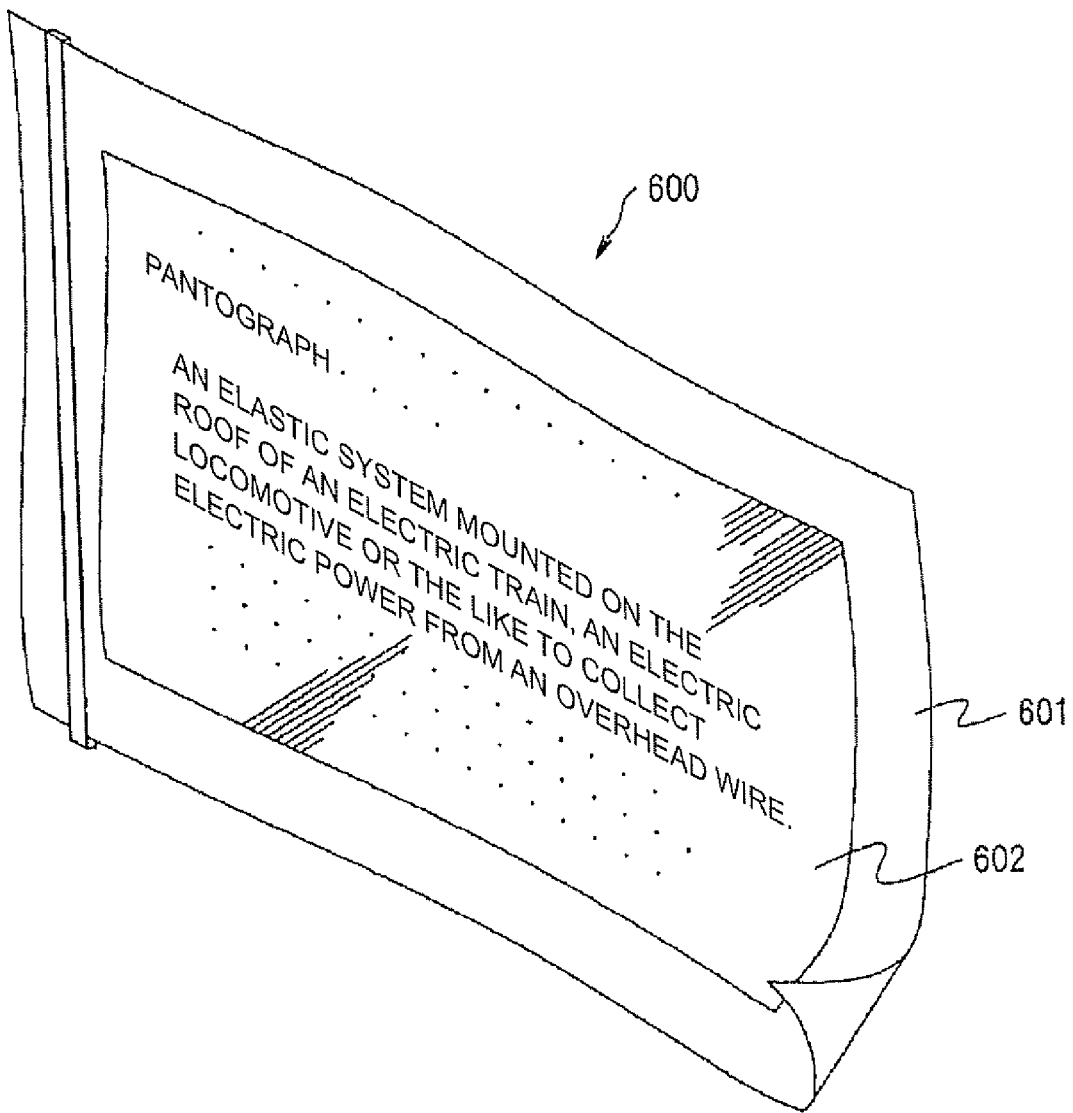
FIG. 5 perspectively illustrates an embodiment in which an electronic apparatus according to an embodiment of the invention is applied to an electronic paper.

FIG. 5 is a perspective view showing the embodiment for applying the electronic apparatus of the embodiment to the electronic paper.

An electronic paper 600 shown in FIG. 5 includes a main body 601 and a display unit 602. The main body 601 is made of a rewritable sheet having the same texture and flexibility as paper.

The display unit 602 included in the electronic paper 600 is composed of the electrophoretic display 20 as described above.

2. Display

Next will be described an embodiment in which the electronic apparatus of the embodiment is applied to a display.

Figure 6A:
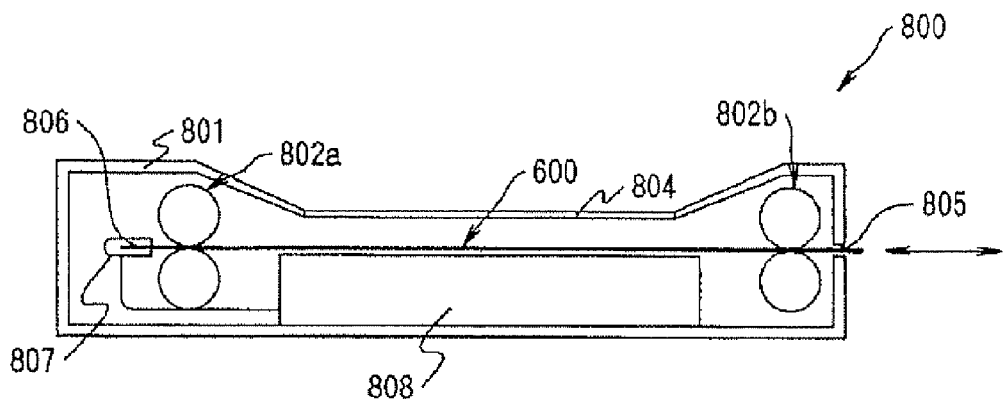
FIGS. 6A and 6B illustrate an embodiment in which the electronic apparatus according to the embodiment is applied to a display.
Figure 6B:
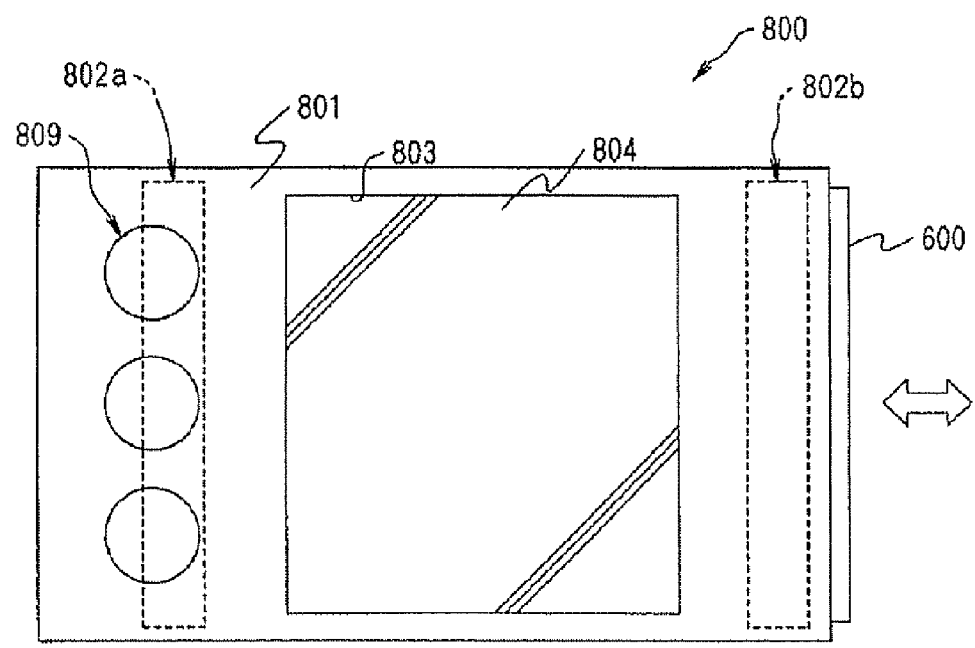

FIGS. 6A and 6B show the embodiment for applying the electronic apparatus of the embodiment to the display. FIG. 6A is a sectional view of the display and FIG. 6B is a plan view thereof.

A display 800 shown in FIGS. 6A and 6B includes a main body 801 and the electronic paper 600 detachably disposed therein. The electronic paper 600 has the same structure as the above-described structure, namely, that shown in FIG. 5.

The main body 801 has an insertion slot 805 in a side portion thereof (a right side in FIG. 6A) to insert the electronic paper 600. Inside the main body 801 are disposed two pairs of carrying rollers 802a and 802b. The electronic paper 600 is inserted in the main body 801 through the insertion slot 805 and placed therein such that the paper is sandwiched by the carrying rollers 802a and 802b.

On a display surface of the main body 801 (in FIG. 6B on a front side of the page) is formed a rectangular concave portion 803 for fitting a transparent glass plate 804 therein. Through the glass plate 804, the electronic paper 600 placed inside the main body 801 can be visually recognized from an outside of the main body 801. In short, the display surface of the display 800 is a region where the electronic paper 600 placed inside the main body 801 is visually recognized through the transparent glass plate 804.

At a top end of the electronic paper 600 in an inserted direction (a left side in each of FIGS. 6A and 6B) is provided a terminal portion 806. Inside the main body 801 is provided a socket 807, which is connected to the terminal portion 806 in the state where the electronic paper 600 is incorporated in the main body 801. The socket 807 is electrically connected to a controller 808 and an operation unit 809.

In the display 800 structured as above, the electronic paper 600 is detachably disposed in the main body 801 and also can be detached from the main body 801 to be used portably.

Additionally, in the above display 800, the electronic paper 600 includes the electrophoretic display 20 as described above.

The electronic apparatus of the embodiment is not restricted to the applications described above. As examples for applying the electronic apparatus of the embodiment, there may be mentioned a TV set, a videotape recorder of view finder type or monitor viewing type, a car navigation device, a pager, an electronic organizer, an electronic calculator, an electronic newspaper, a word processor, a personal computer, a workstation, a videophone, a POS terminal, an apparatus equipped with a touch pane, and the like. The electrophoretic display 20 of the embodiment can be applied to displays for the various electronic apparatuses.

Hereinabove, the exemplary embodiments of the invention have been described based on the drawings for illustrating the embodiments. However, the invention is not restricted to the above embodiments. For example, the structure of each part in the embodiments can be replaced by any other arbitrary structure having similar functions. In addition, any other arbitrary constituent component may be added into the invention if needed.

Furthermore, in the above embodiments, the single pair of electrodes is disposed in opposite to each other. Instead, for example, in the invention, there may be adopted an embodiment for applying a structure in which a pair of electrodes is both disposed on the same substrate.

In addition, in the above embodiments, the single pair of substrates is opposed to each other. Alternatively, for example, there may be adopted an embodiment for applying a structure with a single substrate.

In addition, in the above embodiments, each microcapsule is arranged so as to be extended over the two adjacent pixel electrodes (the electrodes). Instead, for example, the microcapsule may be extended over three or more adjacent pixel electrodes, or may be disposed so as not to be extended over the adjacent pixel electrodes. Alternatively, those different arrangements may be combined together.

Furthermore, at least one arbitrary step may be added in the method for producing the electrophoretic display of the embodiment.

EXAMPLES

Next, a description will be given of concrete examples of the display according to the embodiment of the invention.

1. Production of the Electrophoretic Display

Example 1

<1> Preparation of the Electrophoretic Particles

<1-1> Preparation of the White Particles

First, 50 g of titanium oxide (TIPAQUE CR90 produced by Ishihara Sangyo Kaisha Ltd.), 5 g of acrylic polymer (mass mean molecular weight 6,800) composed of dodecyl methacrylate, 2-ethylhexyl acrylate, and γ-methacryloxypropyl trimethoxysilane (in a compositional molar ratio of 80:15:5), and 100 g of hexane were placed in a 300-ml separable flask equipped with a stirring blade. Then, the flask was placed in an ultrasonic bath (BRANSON 5210 produced by Yamato Science Co., Ltd.) at 55° C. While stirring in the ultrasonic bath, ultrasonic dispersion treatment was conducted for two hours.

Next, the separable flask was placed into a hot water bath at 90° C. and the solvent was evaporated. Power of titanium oxide was taken out from the flask and placed on a tray. Thereafter, heating treatment was conducted at 150° C. by a drier for five hours.

The heat-treated titanium oxide was dispersed in 100 g of hexane. Then, after separated by a centrifugal sedimentation apparatus, titanium oxide was washed three times and was dried at 100° C.

As a result, the surface of titanium oxide was subjected to titanium treatment and alumina treatment, whereby white particles with grafted polymer layers were obtained. A mean particle size thereof was 200 nm.

<2> Production of the Microcapsules

The obtained white particles were dispersed in a liquid phase dispersion medium (IsoparG produced by ExxonMobil Chemical Company) to prepare an electrophoretic dispersion liquid.

In this case, the electrophoretic dispersion liquid contained the white particles 30% by weight and the IsoparG 70% by weight.

Next, the electrophoretic dispersion liquid was dropped in a solution with gelatin dissolved therein and the mixture solution was stirred at a rotation velocity of 1,300 rpm.

Then, acetic acid was added to the solution to adjust the pH of the solution to 3.7. Thereafter, capsules were extracted by ice-cooling. Additionally, formaldehyde was added to form a crosslinking structure in the capsules.

Next, after stirring was continued for 24 hours, particle size classification was conducted, so as to obtain microcapsules (a mean particle diameter: 20 μm).

<3> Preparation of the Microcapsule Dispersion Liquid

Next, the obtained microcapsules and 2-ethylhexyl-methacrylate (a melting point: 25° C. or lower) were mixed together so as to give a weight ratio of 3:2, whereby a microcapsule dispersion liquid was prepared.

In this case, 2-ethylhexylmethacrylate was in the liquid phase at 25° C. and had viscosity. The 180-degree peel adhesion strength (in accordance with JIS-K-6854) thereof was 50N/25 mm.

<4> Formation of the Microcapsule-Containing Layer

There was prepared a polyethylene terephthalate (PET)-indium tin oxide (ITO) substrate (OTEC 220B by Oike Industry, Co., Ltd.) having a second electrode made of ITO formed thereon.

Next, the microcapsule dispersion liquid obtained in the above step C was used to form a microcapsule-containing layer on ITO of the prepared PET-ITO substrate by using a doctor-blade technique. The formed microcapsule-containing layer had a mean thickness of 30 μm.

<5> Formation of the Adhesive Layer

Next, there were prepared a sheet-shaped adhesive layer with a mean thickness of 15 μm. The adhesive layer was placed on the microcapsule-containing layer under a room temperature of 25° C. Thereby, the mean thickness of the microcapsule-containing layer became approximately 15 μm, as well as the microcapsules were deformed to be flattened. In short, a formation of the stone-wall structure was observed.

In this case, the adhesive layer was made of a mixture prepared by mixing polyurethane and EO-denatured dicyclopentenylmethacrylate in a weight ratio of 95:5.

<6> Bonding of the Circuit Board

Next, on the adhesive layer was placed a circuit board having a first electrode made of ITO formed thereon to bond the circuit board to the layer under the room temperature of 25° C.

<7> Sealing Step

Lastly, an edge region (an outer peripheral region) between the display sheet and the circuit board was sealed with an epoxy adhesive, resulting in a production of the electrophoretic display shown in FIG. 1.

Example 2

Example 2 was conducted in the same manner as Example 1 to obtain an electrophoretic display, excepting that the content ratios of the white particles and the IsoparG in the electrophoretic dispersion liquid were 60.0% wt. and 40% wt., respectively, with respect to the dispersion liquid, in Example 2.

Example 3

Example 3 was conducted in the same manner as Example 1 to obtain an electrophoretic display, excepting that black particles obtained as below were used and the content ratios of the white particles and the black particles in the electrophoretic dispersion liquid were changed as shown below in Example 3.

<1-2> Preparation of the Black Particles

First, 50 g of carbon black, 5 g of acrylic polymer (mass mean molecular weight 6,800) composed of dodecyl methacrylate, 2-ethylhexyl acrylate, and γ-methacryloxypropyl trimethoxysilane (in a compositional molar ratio of 80:15:5), and 100 g of hexane were placed in a 300-mL separable flask equipped with a stirring blade. Then, the flask was placed in the ultrasonic bath (BRANSON 5210 by Yamato Science Co., Ltd.) at 55° C. While stirring in the ultrasonic bath, ultrasonic dispersion treatment was conducted for two hours.

Next, the separable flask was placed into a hot water bath at 90° C. and the solvent was evaporated. Power of carbon black was taken out from the flask and placed on a tray. Thereafter, heating treatment was conducted at 150° C. by using a drier for five hours.

The heat-treated carbon black was dispersed in 100 g of hexane, and then, separated and washed by a centrifugal sedimentation apparatus. The operation was repeated three times and the product was dried at 100° C.

As a result, there were obtained black particles in which a polymer grafted layer was formed on the carbon black. A mean particle size thereof was 60 nm.

<2> Production of the Microcapsules

The white particles obtained in Example 1 and the black particles obtained in the above step <1-2> were dispersed in the liquid phase dispersion medium IsoparG (produced by ExxonMobil Chemical Co.) to prepare an electrophoretic dispersion liquid.

The content ratios of the while particles, the black particles, and the IsoparG in the electrophoretic dispersion liquid were 29.4% wt., 0.6% wt., and 70% wt., respectively.

Example 4

Example 4 was conducted in the same manner as Example 3 to obtain an electrophoretic display, excepting that the content ratios of the white particles and the black particles in the electrophoretic dispersion liquid were 28.8% wt. and 1.2% wt., in Example 4.

Example 5

Example 5 was conducted in the same manner as Example 3 to obtain an electrophoretic display, excepting that the content ratios of the white particles and the black particles in the electrophoretic dispersion liquid were 28.2% wt. and 1.8% wt., in Example 5.

Example 6

Example 6 was conducted in the same manner as Example 3 to obtain an electrophoretic display, excepting that the content ratios of the white particles, the black particles, and the IsoparG in the electrophoretic dispersion liquid were 58.8% wt., 1.2% wt., and 40% wt., respectively, in Example 6.

Example 7

Example 7 was conducted in the same manner as Example 6 to obtain an electrophoretic display, excepting that the content ratios of the white particles and the black particles in the electrophoretic dispersion liquid were 57.6% wt. and 2.4% wt., in Example 7.

Example 8

Example 8 was conducted in the same manner as Example 6 to obtain an electrophoretic display, excepting that the content ratios of the white particles and the black particles in the electrophoretic dispersion liquid were 56.4% wt. and 3.6% wt., in Example 8.

Example 9

Example 9 was conducted in the same manner as Example 3 to obtain an electrophoretic display, excepting that the content ratios of the white particles and the black particles in the electrophoretic dispersion liquid were 29.6% wt. and 0.4% wt., in Example 9.

Example 10

Example 10 was conducted in the same manner as Example 3 to obtain an electrophoretic display, excepting that the content ratios of the white particles and the black particles in the electrophoretic dispersion liquid were 28.0% wt. and 2.0% wt., in Example 10.

Example 11

Example 11 was conducted in the same manner as Example 6 to obtain an electrophoretic display, excepting that the content ratios of the white particles and the black particles in the electrophoretic dispersion liquid were 59.0% wt. and 1.0% wt., in Example 11.

Example 12

Example 12 was conducted in the same manner as Example 6 to obtain an electrophoretic display, excepting that the content ratios of the white particles and the black particles in the electrophoretic dispersion liquid were 56.2% wt. and 3.8% wt., in Example 12.

Comparative Example 1

Comparative Example 1 was conducted in the same manner as Example 1 to obtain an electrophoretic display, excepting that the content ratios of the white particles and the IsoparG in the electrophoretic dispersion liquid were 28.0% wt. and 72% wt., in Comparative Example 1.

Comparative Example 2

Comparative Example 2 was conducted in the same manner as Comparative Example 1 to obtain an electrophoretic display, excepting that the content ratios of the white particles and the IsoparG in the electrophoretic dispersion liquid were 62.0% wt. and 38% wt., in Comparative Example 2.

Comparative Example 3

Comparative Example 3 was conducted in the same manner as Example 3 to obtain an electrophoretic display, excepting that the content ratios of the white particles, the black particles, and the IsoparG in the electrophoretic dispersion liquid were 27.7% wt., 0.3% wt., and 72% wt., respectively, in Comparative Example 3.

Comparative Example 4

Comparative Example 4 was conducted in the same manner as Example 3 to obtain an electrophoretic display, excepting that the content ratios of the white particles, the black particles, and the IsoparG in the electrophoretic dispersion liquid were 26.0% wt., 2.0% wt., and 72% wt., respectively, in Comparative Example 4.

Comparative Example 5

Comparative Example 5 was conducted in the same manner as Example 3 to obtain an electrophoretic display, excepting that the content ratios of the white particles, the black particles, and the IsoparG in the electrophoretic dispersion liquid were 61.4% wt., 0.6% wt., and 38% wt., respectively, in Comparative Example 5.

Comparative Example 6

Comparative Example 6 was conducted in the same manner as Example 3 to obtain an electrophoretic display, excepting that the content ratios of the white particles, the black particles, and the IsoparG in the electrophoretic dispersion liquid were 57.7% wt., 4.3% wt., and 38% wt., respectively, in Comparative Example 6.

Comparative Example 7

Comparative Example 7 was conducted in the same manner as Example 3 to obtain an electrophoretic display, excepting that a silicone adhesive (an emulsion adhesive) was used as a binder and water was used as a binder dispersion liquid to prepare the microcapsule dispersion liquid in Comparative Example 7.

In this case, a compounding ratio of the microcapsules, the binder, and the water was set to a weight ratio of 56:4:40.

Comparative Example 8

Comparative Example 8 was conducted in the same manner as Comparative Example 7 to obtain an electrophoretic display, excepting that the content ratios of the white particles and the black particles in the electrophoretic dispersion liquid were both 15.0% wt., in Comparative Example 8.

Comparative Example 9

Comparative Example 9 was conducted in the same manner as Comparative Example 7 to obtain an electrophoretic display, excepting that the content ratios of the white particles, the black particles, and the IsoparG in the electrophoretic dispersion liquid were 26.0% wt., 2.0% wt., and 72% wt., respectively, in Comparative Example 9.

2. Evaluation

In each of the electrophoretic displays obtained by the above Examples and Comparative Examples, a DC voltage of 25V was applied between both the electrodes in the electrophoretic display at −20° C. for 0.4 seconds. As a result, it was observed that the electrophoretic particles took approximately three seconds to migrate between the electrodes. Evaluation was conducted regarding reflectance, contrast, and display evenness.

(1) Reflectance

White and Black color images were displayed on an entire one-side surface of the electrophoretic display by switching the polarity of the voltage applied. A reflection density D of each color was measured by using Gretag Macbeth spectrophotometer/Densitometer (SpectroEye produced by Gretag-Macbeth Co. Ltd.), whereby the reflectance of each color was obtained by the following expression:

$$\text{Reflectance} = 100/10D$$

(2) Contrast

Based on the obtained reflectance, contrast was calculated by the following expression, and calculation results are shown together in Table 1 below.

Contrast=White Reflectance/Black Reflectance (3) Display Evenness

Display conditions were visually checked to evaluate on the basis of the following four-stage criteria. Results of the check are shown together in Table 1 below.
A: No display unevenness was observed.
B: Almost no display unevenness was observed.
C: Some degree of unevenness was observed.
D: A great degree of unevenness was observed.

In Comparative Examples 4 and 6, since white reflectance was low, the white particles looked gray and thus contrast was low.

In Comparative Examples 7 to 9, the used binder did not have viscosity under room temperature, so that display unevenness occurred and had poor yields.

As described above, any of Comparative Examples 1 to 9 could not produce an electrophoretic display with high contrast and display evenness.

Regarding the electrophoretic displays produced in Examples and Comparative Examples, the arrangement states of the microcapsules were checked. As a result, in each of Examples, the microcapsules were located almost evenly and were flattened in each part of a display region in the

TABLE 1

| | White (% wt.) (White/All Particles) | Black (% wt.) (Black/All Particles) | Electrophoretic Particles (% wt.) | IsoparG (% wt.) | Binder | Reflectance (%) White | Black | Contrast | Display Evenness |
|---|---|---|---|---|---|---|---|---|---|
| Ex1 | 30.0 (100) | 0 (0) | 30 | 70 | B | 50.0 | — | — | A |
| Ex2 | 60.0 (100) | 0 (0) | 60 | 40 | B | 60.0 | — | — | A |
| Ex3 | 29.4 (98) | 0.6 (2) | 30 | 70 | B | 39.0 | 5.0 | 7.8 | A |
| Ex4 | 28.8 (96) | 1.2 (4) | 30 | 70 | B | 37.0 | 4.6 | 8.0 | A |
| Ex5 | 28.2 (94) | 1.8 (6) | 30 | 70 | B | 33.0 | 4.2 | 7.9 | A |
| Ex6 | 58.8 (98) | 1.2 (2) | 60 | 40 | B | 39.6 | 5.0 | 7.9 | A |
| Ex7 | 57.6 (96) | 2.4 (4) | 60 | 40 | B | 37.2 | 4.4 | 8.5 | A |
| Ex8 | 56.4 (94) | 3.6 (6) | 60 | 40 | B | 32.0 | 4.1 | 7.8 | A |
| Ex9 | 29.6 (98.7) | 0.4 (1.3) | 30 | 70 | B | 39.0 | 8.0 | 4.9 | A |
| Ex10 | 28.0 (93.3) | 2.0 (6.7) | 30 | 70 | B | 26.0 | 4.2 | 6.2 | A |
| Ex11 | 59.0 (98.3) | 1.0 (1.7) | 60 | 40 | B | 39.3 | 8.4 | 4.7 | A |
| Ex12 | 56.2 (93.6) | 3.8 (6.3) | 60 | 40 | B | 25.0 | 4.1 | 6.1 | A |
| CEx1 | 28.0 (100) | 0 (0) | 28 | 72 | B | 30.0 | — | — | D |
| CEx2 | 62.0 (100) | 0 (0) | 62 | 38 | B | — | — | — | — |
| CEx3 | 27.7 (99) | 0.3 (1) | 28 | 72 | B | 26.0 | 8.2 | 3.2 | C |
| CEx4 | 26.0 (93) | 2.0 (7) | 28 | 72 | B | 25.0 | 4.7 | 5.3 | C |
| CEx5 | 61.4 (99) | 0.6 (1) | 62 | 38 | B | 38.1 | 8.3 | 4.6 | C |
| CEx6 | 57.7 (93) | 4.3 (7) | 62 | 38 | B | 25.4 | 4.5 | 5.6 | C |
| CEx7 | 29.4 (98) | 0.6 (2) | 30 | 70 | D | 39.0 | 5.0 | 7.8 | D |
| CEx8 | 15.0 (50) | 15.0 (50) | 30 | 70 | D | 20.1 | 12.1 | 1.7 | D |
| CEx9 | 26.0 (93) | 2.0 (7) | 28 | 72 | D | 25.0 | 4.7 | 5.3 | D |

Note:
In Table 1, "Ex" represents Example, and "CEx" represents Comparative Example.

In Table 1, symbols B shown in the column of "Binder" indicate that the used binder had viscosity under room temperature, whereas symbols D indicate that the used binder had no viscosity under room temperature.

As a result, almost no display unevenness was found in Examples 1 to 12 using the binders with viscosity under room temperature. Additionally, the appropriate amount of the electrophoretic particles were contained in the electrophoretic dispersion liquid, so that the displays produced in Examples 1 to 12 exhibited excellent white and black reflectances with high contrasts. Consequently, the electrophoretic displays of Examples 1 to 12 had excellent display performance, without yield loss.

In contrast, in Comparative Example 1, the adhesive layer was seen through and sufficient white-color diffusion was not obtained.

In Comparative Example 2, the electrophoretic dispersion liquid turned into a gel, so that the white particles could not migrate.

In Comparative Examples 3 and 5, since black reflectance was high, the black particles looked gray and thus contrast was low.

electrophoretic display. On the other hand, although the microcapsules in Comparative Examples were observed to be flattened, there existed a region with the microcapsules overlapping each other and a region without any microcapsule located.

Furthermore, there were obtained excellent display performance in electrophoretic displays produced as in the above Examples by using one of or a combination of two or more of compounds such as lauryl acrylate, cyclohexyl acrylate, cetyl acrylate, isobutyl methacrylate, lauryl methacrylate, and cyclohexyl methacrylate, all of which had viscosity under room temperature.

What is claimed is:
1. An electrophoretic display sheet, comprising:
a substrate that includes a surface side; and
a microcapsule-containing layer provided on the surface side of the substrate, the microcapsule-containing layer containing a microcapsule and a binder that retains the microcapsule, the microcapsule having an electrophoretic dispersion liquid and a shell that encloses the electrophoretic dispersion liquid therein,
the electrophoretic dispersion liquid containing at least one kind of electrophoretic particles;

the binder having fluidity at a temperature of approximately room temperature and below;

the binder having a 180-degree peel adhesion strength ranging from 5N/25 mm to 150N/25 mm; and the electrophoretic particles being contained in the electrophoretic dispersion liquid in a ratio of 30% to 60% by weight with respect to a weight of the electrophoretic dispersion liquid.

2. The electrophoretic display sheet according to claim 1, hydrophobic treatment being applied to surfaces of the electrophoretic particles.

3. The electrophoretic display sheet according to claim 1, the binder having a melting point of 25° C. or lower.

4. The electrophoretic display sheet according to claim 1, the binder including (metha) acrylic acid ester.

5. The electrophoretic display sheet according to claim 4, the (metha) acrylic acid ester having a total carbon number ranging from 5 to 20.

6. The electrophoretic display sheet according to claim 1, the shell including a material that contains gelatin.

7. The electrophoretic display sheet according to claim 1, the electrophoretic dispersion liquid being prepared by dispersing the electrophoretic particles in a dispersion medium that contains liquid paraffin.

8. The electrophoretic display sheet according to claim 7, the liquid paraffin being isoparaffin.

9. The electrophoretic display sheet according to claim 8, the isoparaffin having a carbon number ranging from 5 to 15.

10. An electrophoretic display, comprising:
the electrophoretic display sheet according to claim 1; and
an opposing substrate, the opposing substrate being provided on a side facing the surface side of the substrate having the microcapsule-containing layer provided thereon.

11. The electrophoretic display according to claim 10, further comprising an adhesive layer for bonding between the electrophoretic display sheet and the opposing substrate.

12. The electrophoretic display according to claim 11, the adhesive layer having insulating properties.

13. The electrophoretic display according to claim 11, the adhesive layer preventing the diffusion of ions to the opposing substrate from the electrophoretic display sheet.

14. The electrophoretic display according to claim 11, the adhesive layer absorbing and retaining water entering the electrophoretic display.

15. The electrophoretic display according to claim 11, the adhesive layer reducing stress occurring upon the bonding between the electrophoretic display sheet and the opposing substrate.

16. The electrophoretic display according to claim 11, the adhesive layer being predominantly made of polyurethane.

17. The electrophoretic display according to claim 11, wherein under a condition where a mean thickness of the adhesive layer is set to A μm and a mean thickness of the microcapsule-containing layer is set to B μm, a value of A/B ranges from 0.1 to 3.

18. An electronic apparatus comprising the electrophoretic display according to claim 10.

19. A method for producing an electrophoretic display according to claim 1, comprising:
bonding an opposing substrate on a side facing the surface side of the substrate with the microcapsule-containing layer being provided between the substrate and the opposing substrate, the bonding being performed at temperatures of approximately room temperature and below to move and relocate the microcapsules in the microcapsule-containing layer such that an arrangement density of the microcapsules is equalized.

20. The method for producing an electrophoretic display according to claim 19, wherein when the bonding is performed, a thickness of the microcapsule-containing layer is reduced to deform the microcapsule.

21. An electrophoretic display sheet, comprising:
a substrate having a surface side; and
a microcapsule-containing layer provided on the surface side of the substrate, the microcapsule-containing layer containing a microcapsule and a binder that retains the microcapsule, the microcapsule having an electrophoretic dispersion liquid and a shell that encloses the electrophoretic dispersion liquid therein,
the electrophoretic dispersion liquid containing at least one kind of electrophoretic particles;
the binder having viscosity at a temperature of approximately room temperature and below; and
the electrophoretic particles including:
(i) white particles; and
(ii) color particles, the color particles having a tone different from that of the white particles;
(iii) a content ratio of the white particles being in a range from 94% to 98% wt. with respect to a weight of the electrophoretic particles; and
(iv) a content ratio of the color particles being in a range from 2% to 6% wt. with respect to the weight of the electrophoretic particles.

22. The electrophoretic display sheet according to claim 21, the white particles being made of titanium oxide subjected to silica/alumina treatment; and
the color particles being made of carbon black.

* * * * *